US011816692B1

(12) United States Patent
Raak

(10) Patent No.: US 11,816,692 B1
(45) Date of Patent: Nov. 14, 2023

(54) COMPONENT SUPPLY DIGITAL COUPON GENERATION SYSTEM AND RELATED METHODS

(71) Applicant: Inmar Clearing, Inc., Winston-Salem, NC (US)

(72) Inventor: Alise Raak, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/944,987

(22) Filed: Sep. 14, 2022

(51) Int. Cl.
  *G06Q 30/02* (2023.01)
  *G06Q 30/0207* (2023.01)
  *G06Q 30/0601* (2023.01)
  *G06Q 10/0837* (2023.01)
  *G06Q 10/0835* (2023.01)

(52) U.S. Cl.
  CPC ..... *G06Q 30/0223* (2013.01); *G06Q 10/0835* (2013.01); *G06Q 10/0837* (2013.01); *G06Q 30/0623* (2013.01)

(58) Field of Classification Search
  CPC ....... G06Q 30/0207–30/0277; G06Q 10/0835; G06Q 10/0837; G06Q 30/0623
  See application file for complete search history.

(56) References Cited

U.S. PATENT DOCUMENTS

| | | | | |
|---|---|---|---|---|
| 8,229,791 | B2 * | 7/2012 | Bradley | G06G 1/14 705/28 |
| 8,234,149 | B2 * | 7/2012 | Spearman | G06Q 30/0202 705/7.31 |
| 10,592,967 | B1 * | 3/2020 | Shah | G06Q 30/0635 |
| 10,770,899 | B2 * | 9/2020 | Sheble | H02J 3/14 |
| 11,093,884 | B2 * | 8/2021 | Devarakonda | G06N 5/01 |
| 11,475,404 | B2 * | 10/2022 | Adato | G06Q 10/0875 |
| 2010/0106591 | A1 * | 4/2010 | Fuzell-Casey | G06Q 30/0255 701/431 |
| 2014/0058775 | A1 * | 2/2014 | Siig | G06Q 10/06 705/7.12 |
| 2017/0098186 | A1 * | 4/2017 | Song | G06Q 10/087 |
| 2017/0323295 | A1 * | 11/2017 | Kranzley | G06Q 30/0611 |
| 2018/0107914 | A1 * | 4/2018 | Ziola | G06K 7/10 |
| 2018/0315141 | A1 | 11/2018 | Hunn et al. | |

(Continued)

*Primary Examiner* — Thuy N Nguyen
(74) *Attorney, Agent, or Firm* — ALLEN, DYER, DOPPELT, + GILCHRIST, P.A.

(57) ABSTRACT

A component supply processing server may obtain component purchase data for different components from different component suppliers, and obtain purchase settlement data between retailers and manufacturers, each manufacturer selling a product to the retailers, and each product including at least one of the different components. A learning algorithm may determine a predicted shortage of a given component by associating the manufacturers with a given component based upon the corresponding product, and accepting the component purchase data to determine component purchase patterns for each of the different components. The algorithm may determine the predicted shortage by the purchase settlement data to determine product purchase patterns for the products, and correlate the component and product purchase patterns to determine the predicted shortage. The server may generate a digital promotion for a given product based upon the component determined to have the predicted shortage, and communicate the digital promotion to a shopper device.

23 Claims, 9 Drawing Sheets

(56) References Cited

U.S. PATENT DOCUMENTS

| | | | |
|---|---|---|---|
| 2018/0357827 A1* | 12/2018 | Enssle | G06V 20/62 |
| 2019/0315141 A1* | 10/2019 | Morisse | G03F 7/202 |
| 2020/0074402 A1* | 3/2020 | Adato | G06Q 10/06315 |
| 2021/0027226 A1* | 1/2021 | Mohun | G06Q 10/06312 |
| 2022/0067622 A1* | 3/2022 | Devarakonda | G06Q 10/06395 |
| 2022/0114868 A1* | 4/2022 | Bronicki | G06Q 20/40145 |
| 2022/0214668 A1* | 7/2022 | King | G06F 30/20 |
| 2022/0215332 A1* | 7/2022 | Kwok | G06Q 10/087 |
| 2022/0343268 A1* | 10/2022 | Jose | G06Q 20/322 |
| 2022/0358456 A1* | 11/2022 | Rafidi | G06N 20/00 |
| 2022/0383392 A1* | 12/2022 | Bronicki | G06T 7/70 |
| 2022/0405705 A1* | 12/2022 | Kreis | G06Q 10/0835 |
| 2022/0414693 A1* | 12/2022 | Carbonell | G06Q 30/0211 |
| 2023/0110037 A1* | 4/2023 | Cella | G06Q 10/087 |
| | | | 700/117 |
| 2023/0114142 A1* | 4/2023 | Panikkar | G06Q 10/06315 |
| | | | 705/7.25 |
| 2023/0123322 A1* | 4/2023 | Cella | G06Q 10/087 |
| | | | 700/29 |
| 2023/0162038 A1* | 5/2023 | Qi | G06N 3/04 |
| | | | 706/21 |

\* cited by examiner

COMPONENT SUPPLY PROCESSING SERVER

- OBTAIN COMPONENT PURCHASE DATA (E.G., IDENTIFICATION DATA, COMPONENT QUANTITY DATA, COMPONENT ORDER DATE DATA, COMPONENT DELIVERY DATE DATA) FOR EACH OF A PLURALITY OF DIFFERENT COMPONENTS FROM A PLURALITY OF DIFFERENT COMPONENT SUPPLIERS

- OBTAIN PURCHASE SETTLEMENT DATA (E.G., PRODUCT IDENTIFICATION DATA, PRODUCT QUANTITY DATA, PRODUCT PURCHASE PRICE DATA, PRODUCT PURCHASE DATE DATA, AND PRODUCT DELIVERY DATE DATA) BETWEEN RETAILERS AND MANUFACTURERS, EACH MANUFACTURER SELLING A PRODUCT TO THE RETAILERS, AND EACH PRODUCT INCLUDING AT LEAST ONE OF THE DIFFERENT COMPONENTS

- OBTAIN PRODUCT SHIPPING DATA FOR THE PRODUCTS (E.G., SHIPPING DATE DATA, DELIVERY DATE DATA)

- OBTAIN PRODUCT RETURN DATA FOR THE PRODUCTS (E.G., PRODUCT IDENTIFICATION DATA, PRODUCT RETURN PRICE DATA, TIME FROM PURCHASE-TO-RETURN DATA)

- OPERATE A MACHINE LEARNING ALGORITHM TO DETERMINE A PREDICTED SHORTAGE OF A GIVEN COMPONENT FROM AMONG THE DIFFERENT COMPONENTS BY AT LEAST

○ ASSOCIATING EACH OF THE MANUFACTURERS WITH A GIVEN COMPONENT BASED UPON THE CORRESPONDING PRODUCT

○ ACCEPTING, AS A FIRST INPUT TO THE MACHINE LEARNING ALGORITHM, THE COMPONENT PURCHASE DATA TO DETERMINE COMPONENT PURCHASE PATTERNS FOR EACH OF THE DIFFERENT COMPONENTS

○ ACCEPTING, AS A SECOND INPUT TO THE MACHINE LEARNING ALGORITHM, THE PURCHASE SETTLEMENT DATA TO DETERMINE PRODUCT PURCHASE PATTERNS FOR EACH OF THE PRODUCTS

○ ACCEPTING, AS A THIRD INPUT TO THE MACHINE LEARNING ALGORITHM, THE PRODUCT SHIPPING DATA TO DETERMINE PRODUCT SHIPPING PATTERNS FOR EACH OF THE PRODUCTS

○ ACCEPTING, AS A FOURTH INPUT TO THE MACHINE LEARNING ALGORITHM, THE PRODUCT RETURN DATA TO DETERMINE PRODUCT RETURN PATTERNS FOR EACH OF THE PRODUCTS

○ CORRELATING THE COMPONENT AND PRODUCT PURCHASE PATTERNS, PRODUCT SHIPPING PATTERNS, AND PRODUCT RETURN PATTERNS TO DETERMINE, AS AN OUTPUT OF THE MACHINE LEARNING ALGORITHM, THE PREDICTED SHORTAGE OF AT LEAST ONE OF THE COMPONENTS

- GENERATE A DIGITAL PROMOTION FOR A GIVEN PRODUCT (E.G., FROM AMONG THE PRODUCTS) BASED UPON (E.G., THAT INCLUDES) ONE OR MORE OF THE COMPONENTS DETERMINED TO HAVE A COMPONENT SHORTAGE

- COMMUNICATE THE DIGITAL PROMOTION TO THE SHOPPER DEVICE

40'

FIG. 7

COMPONENT SUPPLY DIGITAL COUPON GENERATION SYSTEM AND RELATED METHODS

TECHNICAL FIELD

The present invention relates to the field of component supply, and, more particularly, to component supply digital promotion generation and related methods.

BACKGROUND

A component of a given product, for example, a raw material, may be considered a basic material used to produce a product or a finished good. A component may be processed material or minimally processed, for example. A given component or raw material may have a relatively limited supply, for example, in nature, or limited resources to provide the component from nature. A given component may be limited in supply because of economic, geostrategic, social, health, energy, and/or environmental reasons, for example.

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A component supply system may include a shopper device, and a component supply processing server. The component supply processing server may be configured to obtain component purchase data for each of a plurality of different components from a plurality of different component suppliers, and obtain purchase settlement data between a plurality of retailers and a plurality of manufacturers, each manufacturer selling a product to the plurality of retailers, and each product including at least one of the plurality of different components. The component supply processing server may also be configured to operate a machine learning algorithm to determine a predicted shortage of a given component from among the plurality of different components by at least associating each of the plurality of manufacturers with a given component based upon the corresponding product, and accepting, as a first input to the machine learning algorithm, the component purchase data to determine component purchase patterns for each of the plurality of different components, and accepting, as a second input to the machine learning algorithm, the purchase settlement data to determine product purchase patterns for each of the products. The machine learning algorithm may also be operated to determine the predicted shortage by at least correlating the component and product purchase patterns to determine, as an output of the machine learning algorithm, the predicted shortage of at least one of the plurality of components. The component processing supply server may also be configured to generate a digital promotion for a given product based upon the at least one of the plurality of components determined to have the predicted shortage, and communicate the digital promotion to the shopper device.

The component supply processing server may be configured to generate the digital promotion for a given product from among the plurality thereof that includes the at least one of the plurality of components determined to have a component shortage. The component supply processing server may be configured to obtain product shipping data for the plurality of products, and operate the machine learning algorithm to determine the predicted shortage of the given component by at least accepting, as a third input to the machine learning algorithm, the product shipping data to determine product shipping patterns for each of the products, and correlating the product shipping patterns with the component and product purchase patterns to determine the predicted shortage, for example. The product shipping data may include at least one of shipping date data and delivery date data, for example.

The component supply processing server may be configured to obtain product return data for the plurality of products, and operate the machine learning algorithm to determine the predicted shortage of the given component by at least accepting, a fourth input to the machine learning algorithm, the product return data to determine product return patterns for each of the products, and correlating the product return patterns with the component and product purchase patterns to determine the predicted shortage. The product return data may include at least one of product identification data, product return price data, and time from purchase-to-return data, for example.

The digital promotion may have a redeemable value associated therewith. The component supply processing server may be configured to set the redeemable value based upon the predicted shortage, for example. The component supply processing server may be configured to operate the machine learning algorithm to determine an amount of the predicted shortage, and set the redeemable value of the digital promotion to be lower based upon a higher amount of the predicted shortage, for example.

The purchase settlement data between a plurality of retailers and a plurality of manufacturers may include at least one of product identification data, product quantity data, product purchase price data, product purchase date data, and product delivery date data. The component purchase data may include at least one of component identification data, component quantity data, component order date data, and component delivery date data.

A method aspect is directed to a method of processing component supply. The method may include using a component supply processing server to obtain component purchase data for each of a plurality of different components from a plurality of different component suppliers, and obtain purchase settlement data between a plurality of retailers and a plurality of manufacturers, each manufacturer selling a product to the plurality of retailers, and each product including at least one of the plurality of different components. The method may also include using the component supply processing server to operate a machine learning algorithm to determine a predicted shortage of a given component from among the plurality of different components by at least associating each of the plurality of manufacturers with a given component based upon the corresponding product, and accepting, as a first input to the machine learning algorithm, the component purchase data to determine component purchase patterns for each of the plurality of different components. The machine learning algorithm may be operated to determine the predicted shortage by at least accepting, as a second input to the machine learning algorithm, the purchase settlement data to determine product purchase patterns for each of the products, and correlating the component and product purchase patterns to determine, as an output of the machine learning algorithm, the predicted shortage of at least one of the plurality of components. The method may also include using the component supply processing server to generate a digital promotion for a given product based upon the at least one of the plurality of components determined to have the predicted shortage, and communicate the digital promotion to a shopper device.

A computer readable medium aspect is directed to a non-transitory computer readable medium for processing component supply. The non-transitory computer readable medium includes computer executable instructions that when executed by a processor of a component supply server cause the processor to perform operations. The operations may include obtaining component purchase data for each of a plurality of different components from a plurality different component suppliers, and obtaining purchase settlement data between a plurality of retailers and a plurality of manufacturers, each manufacturer selling a product to the plurality of retailers, and each product including at least one of the plurality of different components. The operations may further include operating a machine learning algorithm to determine a predicted shortage of a given component from among the plurality of different components by at least associating each of the plurality of manufacturers with a given component based upon the corresponding product, accepting, as a first input to the machine learning algorithm, the component purchase data to determine component purchase patterns for each of the plurality of different components, and accepting, as a second input to the machine learning algorithm, the purchase settlement data to determine product purchase patterns for each of the products. The machine learning algorithm may further be operated to determine the predicted shortage by at least correlating the component and product purchase patterns to determine, as an output of the machine learning algorithm, the predicted shortage of at least one of the plurality of components. The operations may further include generating a digital promotion for a given product based upon the at least one of the plurality of components determined to have the predicted shortage, and communicating the digital promotion to a shopper device.

BRIEF DESCRIPTION OF THE DRAWINGS

FIG. 7 is a schematic block diagram of the component supply system of FIG. 5.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
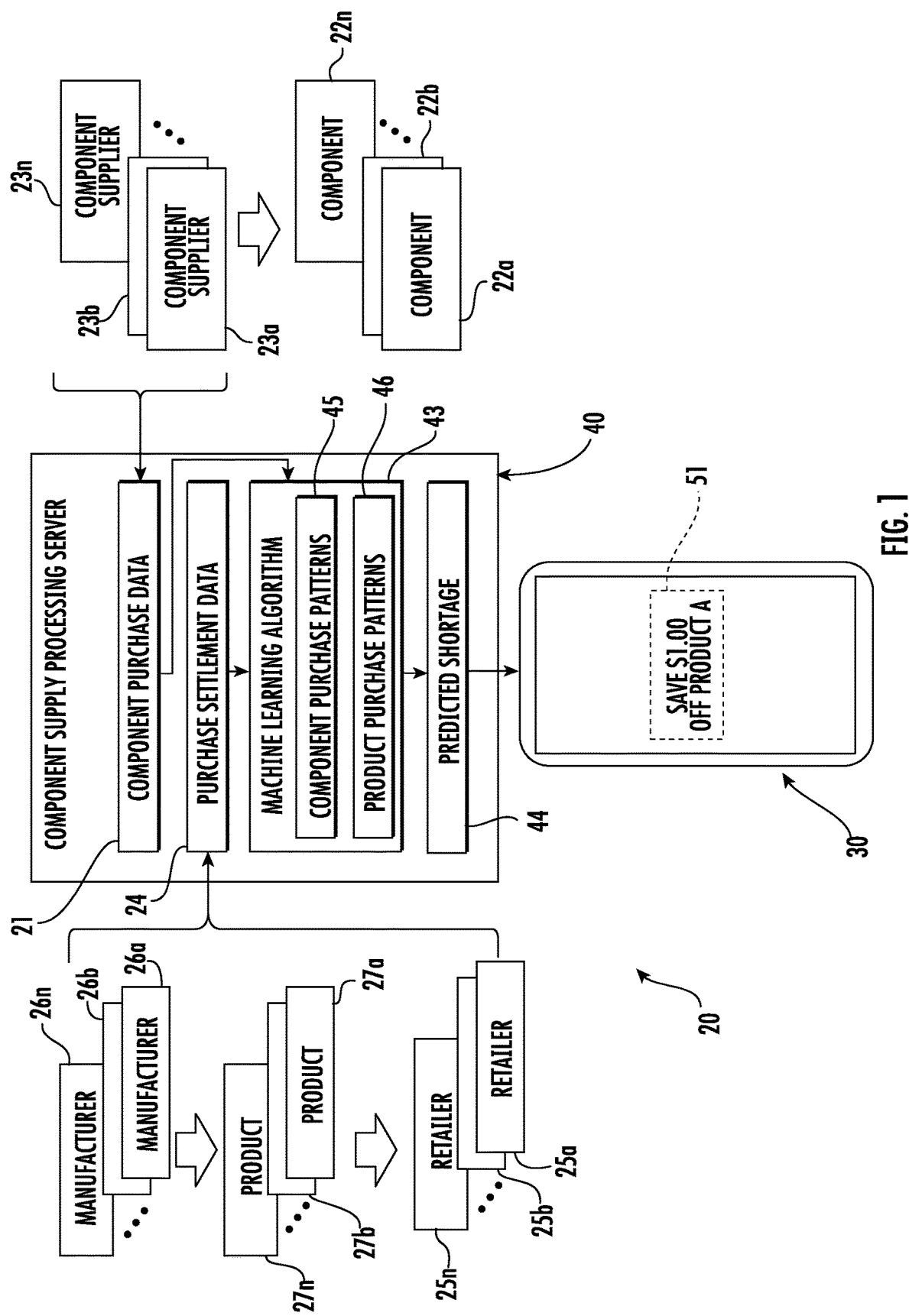
FIG. 1 is a schematic diagram of a component supply system according to an embodiment.
Figure 2:
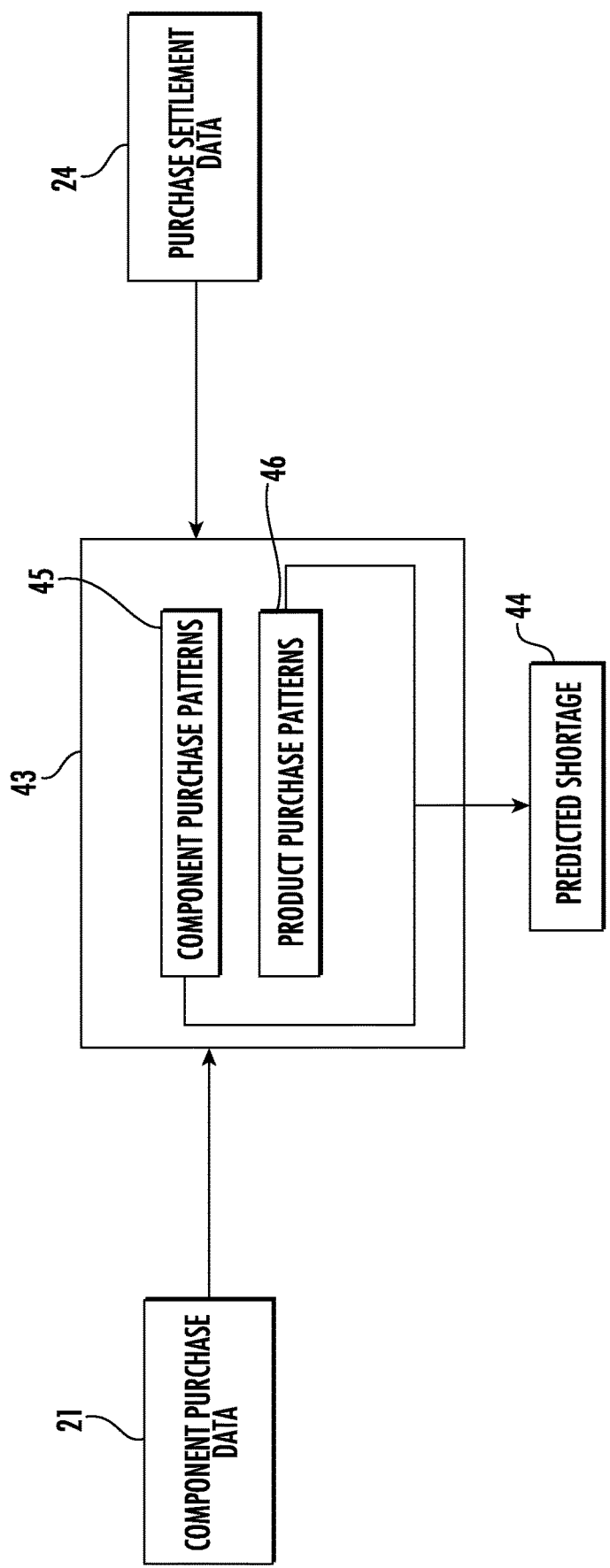
FIG. 2 is a schematic diagram of the machine learning functions of the component supply processing server of FIG. 1.
Figure 3:
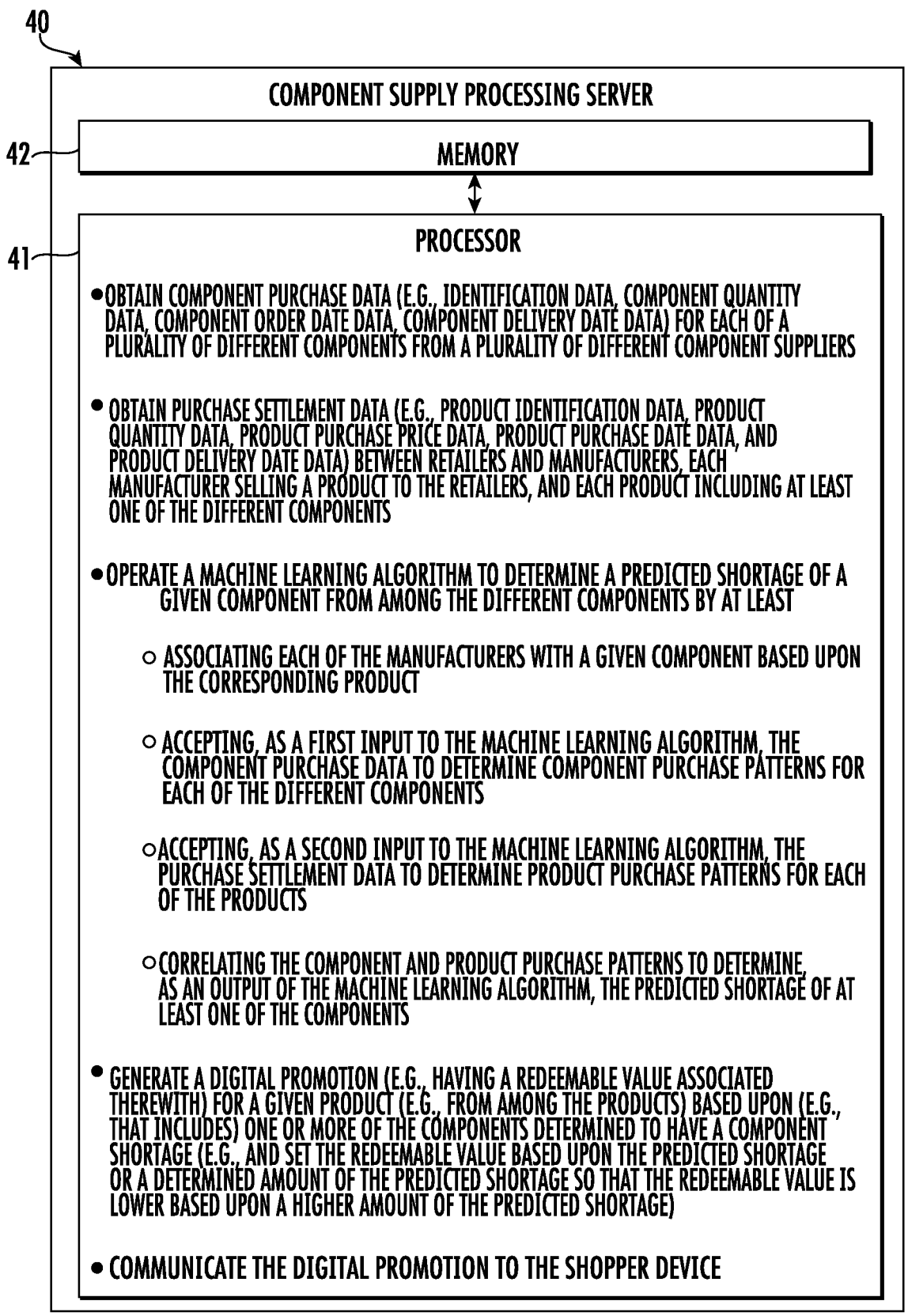
FIG. 3 is a schematic block diagram of the component supply system of FIG. 1.

Referring initially to FIGS. 1-3, a component supply system 20 includes a shopper device 30. The shopper device is illustratively in the form of a mobile wireless communications device, and more particularly, a mobile or smart phone. Of course, the shopper device 30 may be another type of device, such as, for example, a tablet computer, personal computer, or wearable computer.

The component supply system 20 also includes a component supply processing server 40. The component supply processing server 40 includes a processor 41 and an associated memory 42. While operations of the component supply processing server 40 have been described herein, it should be appreciated by those skilled in the art that the processor 41 and the memory 42 cooperate to perform the operations of the component supply processing server.

Figure 4:
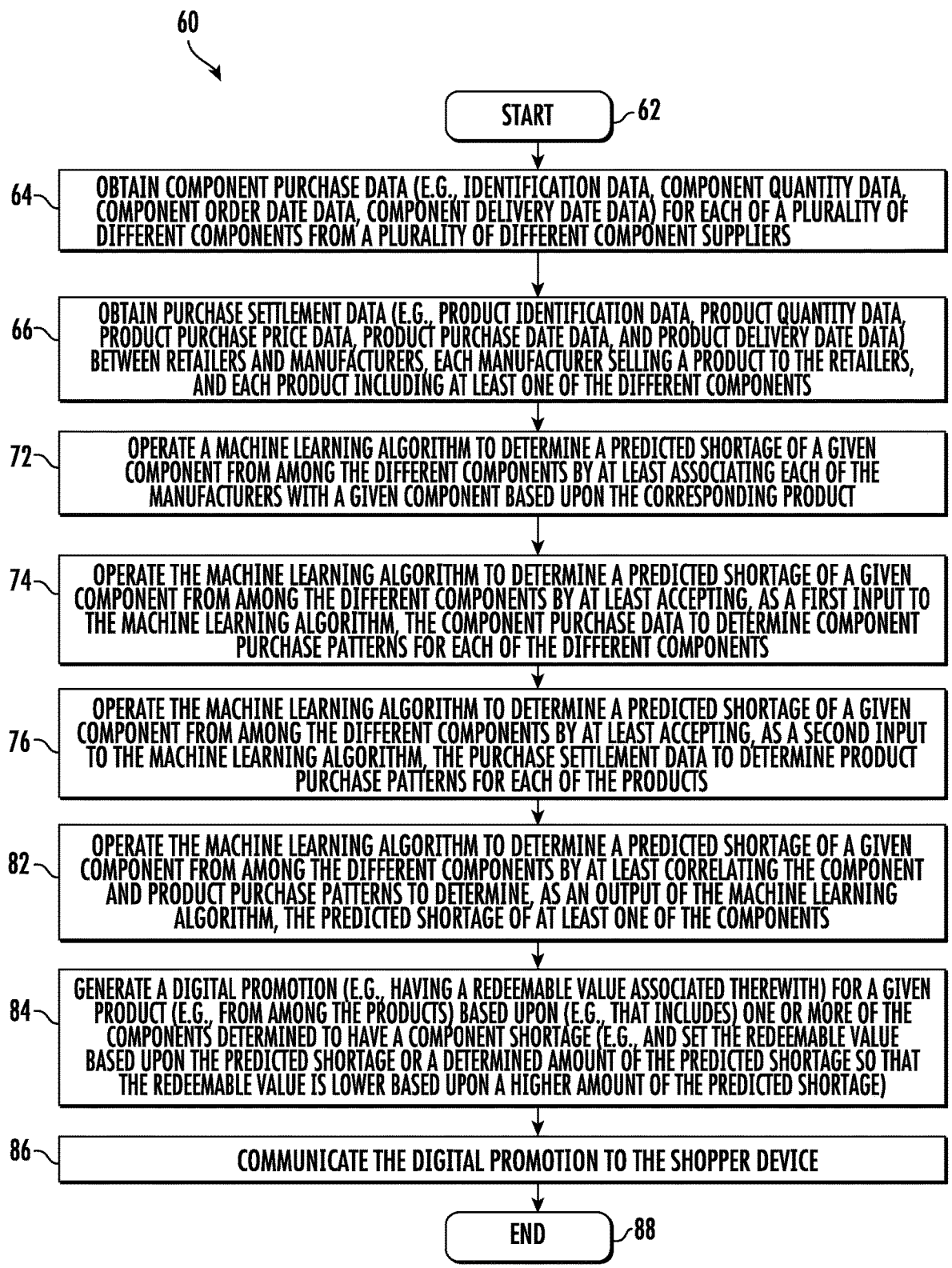
FIG. 4 is a flow diagram illustrating operation of the component supply processing server of FIG. 1.

Referring now additionally to the flowchart 60 in FIG. 4, beginning at Block 62, operations of the component supply processing server 40 will be described. At Block 64, the component supply processing server 40 obtains component purchase data 21 for different components 22a-22n from different component suppliers 23a-23n. For example, a given product 27a may include several components 22a-22n or raw materials that are used in the manufacture of the product. The components 22a-22n may include packaging, such as, for example, bottles, containers, boxes, etc. A component supplier 23a-23n, for example, may typically sell the components to a manufacturer 26a-26n for assembly or use in the manufacture of products 27a-27n.

The component purchase data 21 may include any one or more of identification data (e.g., component description, identification number, etc.), component quantity data (e.g., an amount of component per order, a cumulative amount of orders and/or components across orders), component order date data (e.g., date order was made), and component delivery date data (e.g., date order was shipped, delivered). The component supply processing server 40 may obtain the component purchase data 21 from the different component suppliers 23a-23n by way of communication with the computers associated with each of the different component suppliers. For example, the component supply processing server 40 may obtain the component purchase data 21 as a data stream, e.g., delimited, from the component suppliers 23a-23n, with each data field corresponding to one or more of the different data elements of the component purchase data. The component supply processing server 40 may retrieve the component purchase data 21 from the component suppliers 23a-23n, for example, and store it in a database in the memory 42. In some embodiments, the component supply processing server 40 may obtain the above data from scanned purchase orders, which may be subject to optical character recognition (OCR), for the different components.

The component supply processing server 40, at Block 66, obtains purchase settlement data 24 between retailers 25a-25n and manufacturers 26a-26n. Each manufacturer 26a-26n sells a product 27a-27n to a retailer 25a-25n. Each product 27a-27n includes one or more of the different components 22a-22n. The component supply processing server 40 may obtain the purchase settlement data 24 similarly to the component purchase data 21. The purchase settlement data 24 may be stored in a database, for example, in the memory 42. The purchase settlement data 24 may include one or more of product identification data, product quantity data, product purchase price data, product purchase date data, and product delivery date data, for example. The purchase settlement data 24 may include data indicative of what products were actually delivered versus what products were ordered, for example. The purchase settlement data 24 may include other and/or additional data.

The component supply processing server 40 operates a machine learning algorithm 43 to determine a predicted shortage of any given component 22a from among the different components 22a-22n. To determine the predicted shortage, the component supply processing server 40 associates each of the manufacturers with the given component 22a based upon the corresponding product 27a (Block 72). More particularly, the component supply processing server 40 determines, which components 22a-22n make up or are included in the given product 27a. The component supply processing server 40 may perform this operation based upon a database lookup that may include which products 27a-27n include which components, and optionally in what amount or proportion.

The component supply processing server 40, at Block 74, accepts, as a first input to the machine learning algorithm 43, the component purchase data 21 to determine component purchase patterns 45 for each of the different components 22a-22n. More particularly, the component supply processing server 40, for example, as an intermediate step of the machine learning algorithm 43, determines, for example, with respect to time, pricing, etc., purchase behaviors for the components 22a-22n (e.g., increased in summer months for some components, increased with lower prices, etc.).

At Block 76, the machine learning algorithm 43 accepts, as a second input, the purchase settlement data 24 to determine product purchase patterns 46 for each of the products 27a-27n. Similarly to determining the component purchase patterns 45 at Block 74, the component supply processing server 40, by way of the machine learning algorithm 43, as an intermediate step of the machine learning algorithm, determines, for example, with respect to time, pricing, etc., purchase behaviors for the product 27a-27n (e.g., increased in summer months for some components, increased with lower prices, etc.). By processing via the machine learning algorithm 43 both the component purchase data 21 and the purchase settlement data 24, advantageously, the purchase patterns 45, 46 may be determined for a product along its entire life cycle or along a substantial portion of the supply chain, for example, as will be appreciated by those skilled in the art.

The machine learning algorithm 43, at Block 82, correlates the component and product purchase patterns 45, 46 to determine the predicted shortage 44. More particularly, the machine learning algorithm 43 generates, as an output, the predicted shortage 44 of one or more of the components 22a-22n. The machine learning algorithm 43 may, by correlate, determine when a given pattern occurs with respect to the component purchase pattern 45, which portion or pattern of the product purchase pattern 46 is corresponding. The machine learning algorithm 43 may apply or use one or more of linear regression, neural networks, decision trees, support vector machines, and/or Bayesian networks. The machine learning algorithm 43 may be trained by updating the obtaining of the component purchase data 21 and the purchase settlement data 24. Updating obtaining of the component purchase data 21 and the purchase settlement data 24 may be performed at regular intervals, for example, daily, or in real-time, for example, prior to executing the machine learning algorithm 43 to obtain the predicted shortage of components 22a-22n. Of course, the component purchase data 21 and the purchase settlement data 24 may be obtained at different intervals or upon other occurrences, as will be appreciated by those skilled in the art.

The component supply processing server 40 generates a digital promotion 51, for example, a digital coupon or digital rebate, for a given product 27a, for example, from among the products 27a-27n (Block 84). In some embodiments, the given product may be for another product, for example, of a same brand, that does not include one or more components determined to have the predicted shortage. The given product 27a may include one or more components determined to have the predicted shortage. The component supply processing server 40 communicates the digital promotion 51 to the shopper device 30, for example, wirelessly, for display thereon (Block 86). The component supply processing server 40 may cooperate with the shopper device 30 to save the digital promotion 51 in a digital wallet associated with the shopper or shopper device.

The digital promotion 51 has a redeemable value associated therewith, for example, in the form of a discount off a purchase price of the given product 27a. The component supply processing server 40 may set the redeemable value based upon the predicted shortage. For example, a manufacturer may be running a campaign that has a budget and duration. If the budget has not been exceeded, for example, and a component 22a-22n of the product is determined to have a predicted shortage, the component supply processing server 40 may set the redeemable value of digital promotions (e.g., not yet clipped) to have a lower redeemable value. The lowering of the redeemable value may be based upon the rationale that if a shortage is forthcoming, the supply of the given product will be reduced, and thus it may be desirable to promote other products that may not include the component or components determined to have the predicted shortage. Alternatively, the component supply processing server 40 may set the redeemable value to be higher to compensate for a forthcoming higher price based upon the lower supply.

In some embodiments, the component supply processing server 40 may, by way of the machine learning algorithm 43, determine an amount of the predicted shortage 44. The amount of the predicted shortage 44 may be in terms of percent of typical output of affected products 27a-27n and/or the component 22a-22n itself, or a number in terms of output. The component supply processing server 40 may set the redeemable value of the digital promotion 51 to be lower based upon a higher amount of the predicted shortage 44. The lowering of the redeemable value of the digital promotion 51 based upon the higher amount of the predicted shortage 44 may be based upon a similar rationale as described above, for example. Operations end at Block 88.

Figure 5:
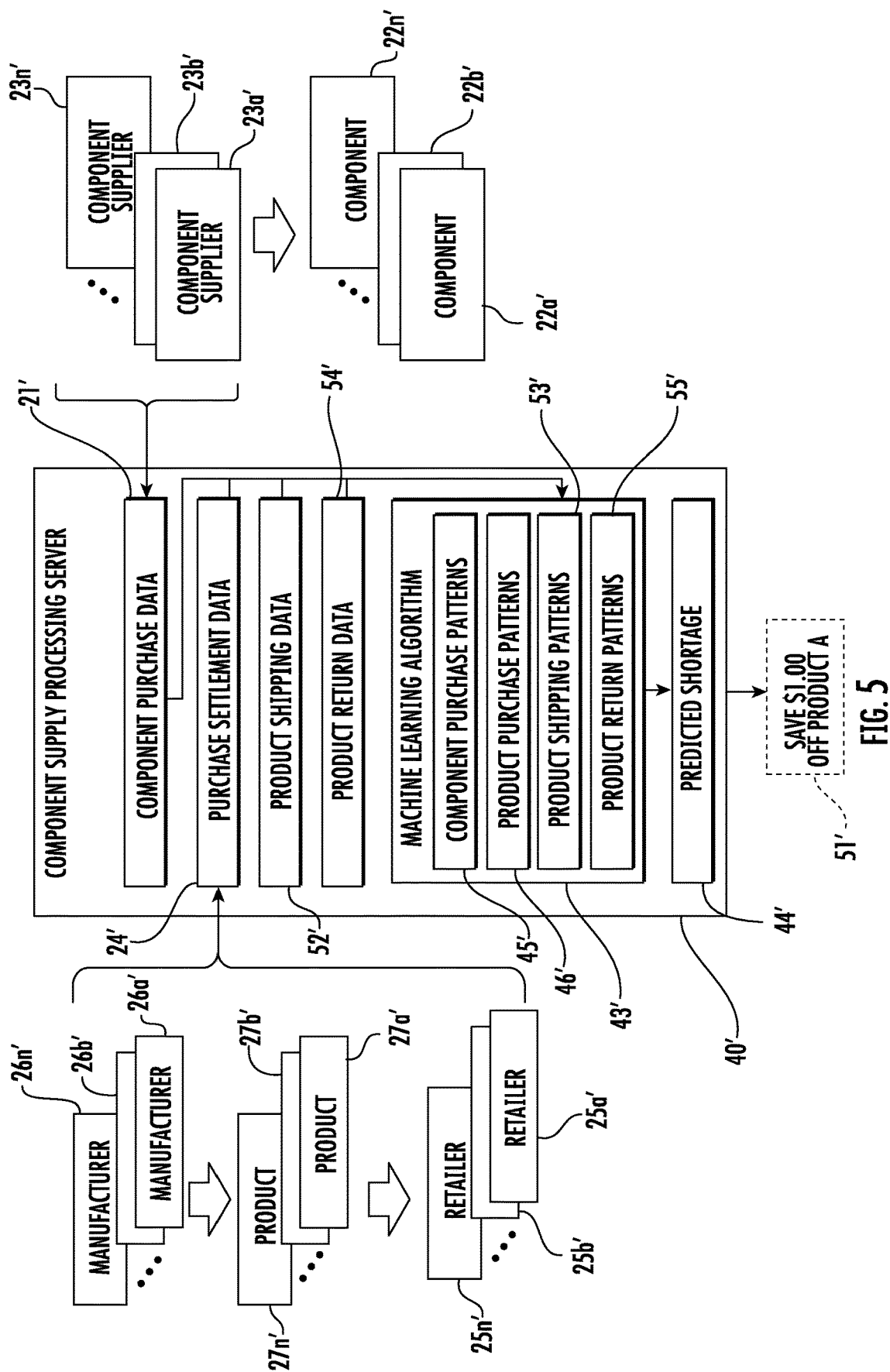
FIG. 5 is a schematic diagram of a component supply system according to another embodiment.
Figure 6:
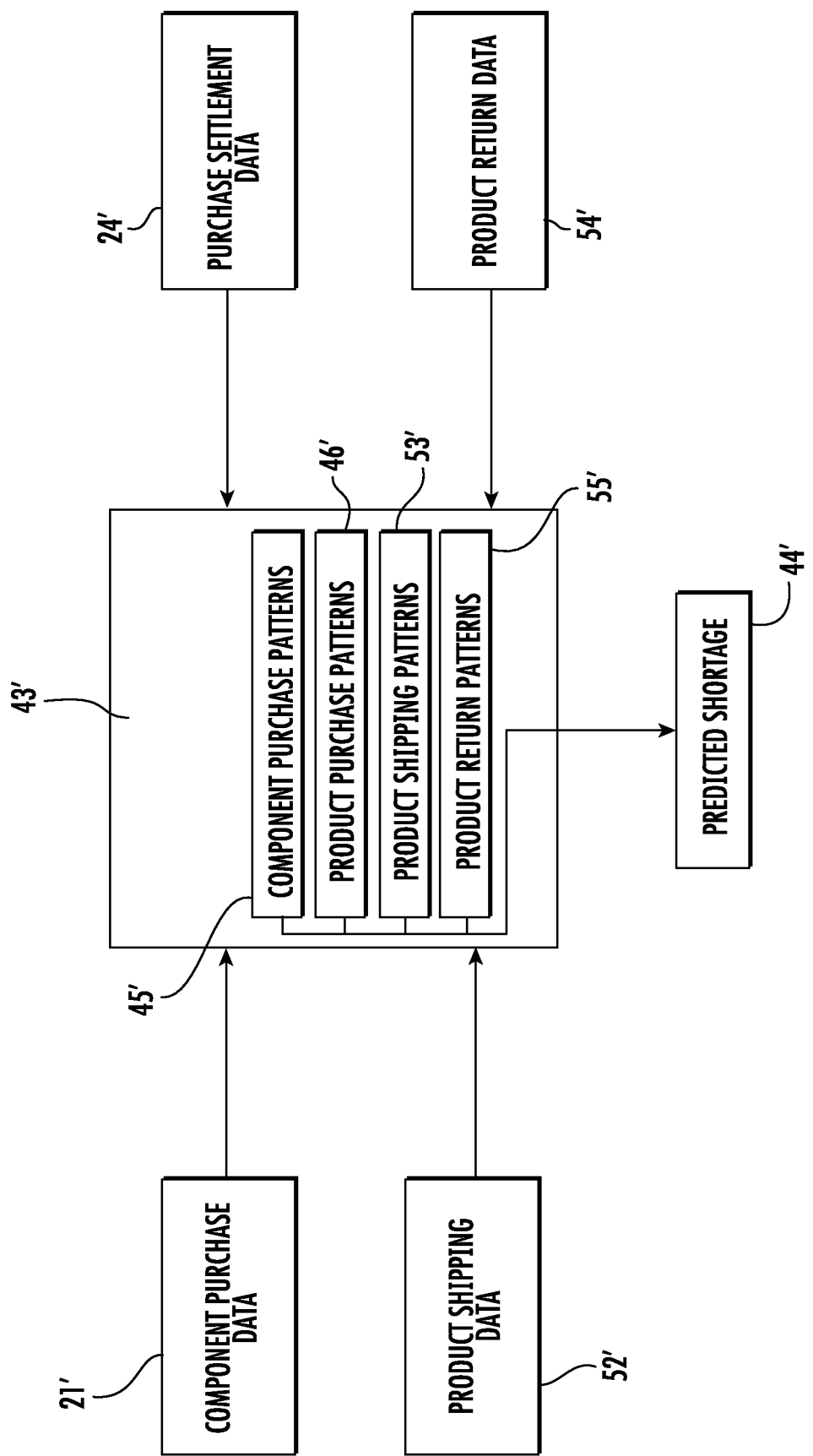
FIG. 6 is a schematic diagram of the machine learning functions of the component supply processing server of FIG. 5.
Figure 8A:
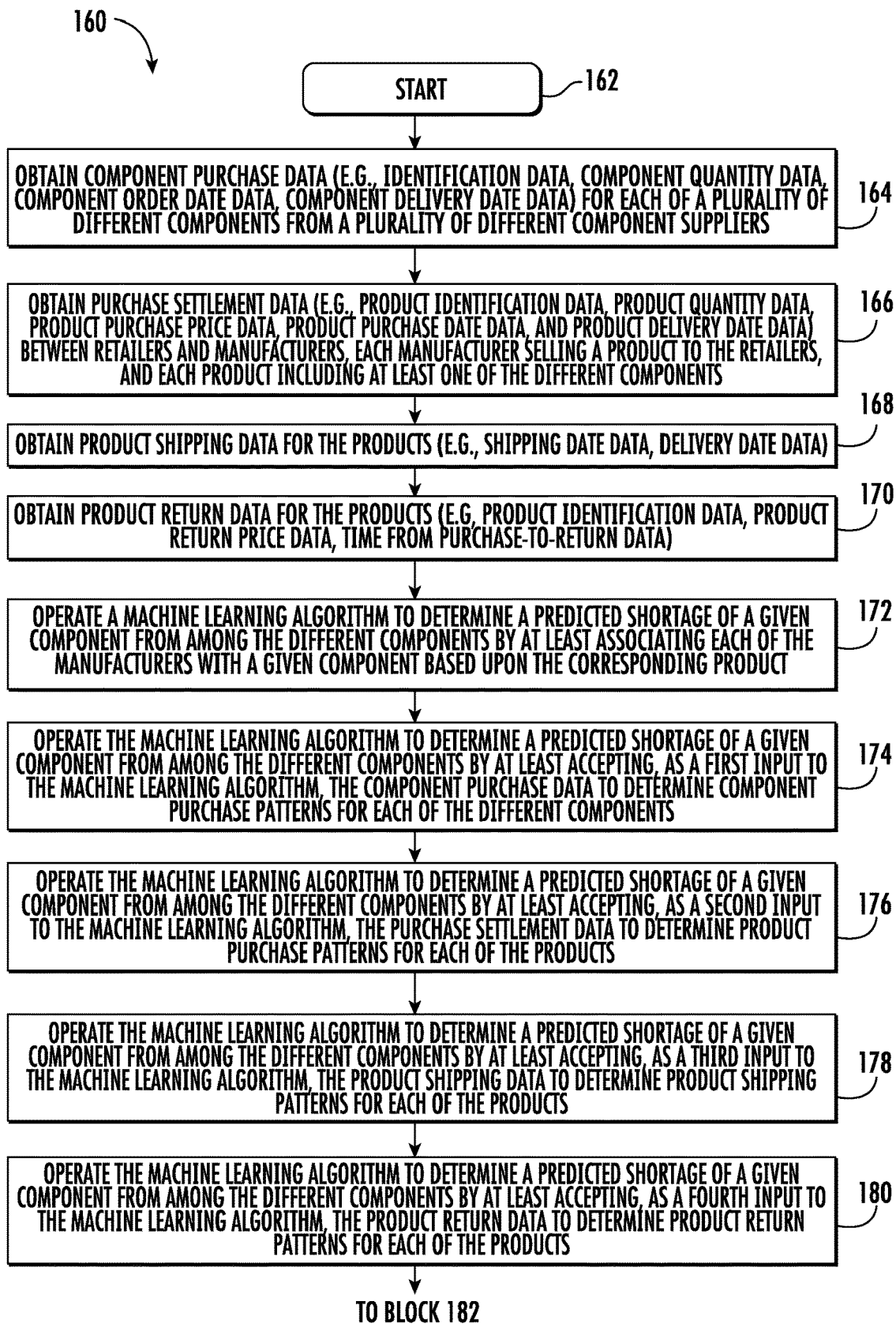
FIGS. 8a and 8b are flow diagrams illustrating operation of the component supply processing server of FIG. 5.
Figure 8B:
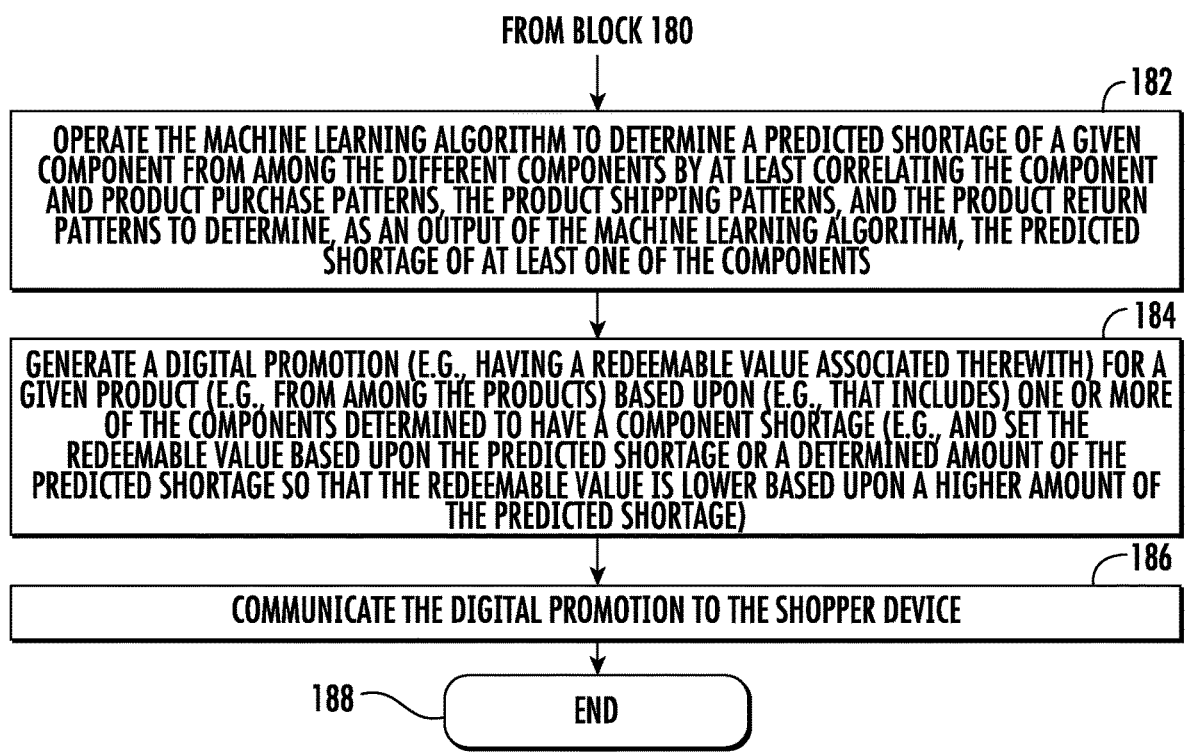

Referring now to FIGS. 5-7 and the flowchart 160 in FIGS. 8a and 8b, operations of the component processing server 40' in accordance with another embodiment will now be described. Beginning at Block 162, the component supply processing server 40' obtains the component purchase data 21' for different components 22a'-22n' from different component suppliers 23a'-23n'(Block 164) and the purchase settlement data 24' (Block 166) between retailers 25a'-25n' and manufacturers 26a'-26n' similar to the operations described above at Blocks 66 and 68, respectively.

At Block 168, the component supply processing server 40' obtains product shipping data 52' for the products 27a'-27n'. The product shipping data 52' may be obtained, for example, using techniques described above, for example, as it relates to a shipper, such as interfacing with shipment tracking software. The shipping data 52' may include one or more of shipping date data and delivery date data. The shipping data 52' may alternatively or additionally be shipping data for the components 22a'-22n'. The product shipping data 52' may include other and/or additional data relating to the shipment of the components 22a'-22n' and/or the products 27a'-27n'.

The component supply processing server 40' may alternatively or additionally obtain product return data 54' for the products 27a'-27n' (Block 170). The return data 54' may be obtained, for example, using techniques described above, for example, as it relates to returns at a retailer 25a'-25n', such as obtained by interfacing with point-of-sale (POS) devices associated with the retailers. The return data 54' may include one or more of return product identification data, product return price data, and time from purchase-to-return data.

Operations of associating (Block 172), and accepting the component purchase data 21' and the purchase settlement data 24' as first and second inputs to the machine learning algorithm 43' (Blocks 174, 176) to determine component and product purchase patterns 45', 46' are similar to the operations at Blocks 72, 74, and 76, described above. At Block 178, the machine learning algorithm 43' is operated to determine the shortage of the given component by accepting, as a third input to the machine learning algorithm, the product shipping data 52'. The machine learning algorithm 43', based upon the input of the shipping data 52', determines product shipping patterns 53' for each of the products 27a'-27n' and/or components 22a'-22n' in the case where the shipping data includes shipping data for the components. The inclusion of product shipping data 52' may advantageously permit the machine learning algorithm 43' to more accurately predict patterns 53' representative of the shortage of the components 22a'-22n'. For example, certain shipping patterns, such as, a relatively large delay between shipping and delivery may be indicative of a shortage of resources within the supply chain. Patterns of a relatively large delay or time period between an estimated ship date and an actual ship date may also be indicative of a predicted shortage.

At Block 180, the machine learning algorithm 43' is operated to determine the predicted shortage 44' of the given component 22a'-22n' by accepting, as a fourth input to the machine learning algorithm, the product return data 54'. The machine learning algorithm 43', based upon the input of the product return data 54', determines product return patterns 55' for each of the products 27a'-27n'. The inclusion of product return data 54' may also be advantageous as it may provide a more accurate predicted shortage 44'. For example, if a smaller than normal amount of returns for a given product 27a'-27n' are being processed, this may be indicative that shoppers are holding on to the given product 27a' (e.g., longer) or have a higher than normal return threshold as they may be a perceived shortage forthcoming.

At Block 182, the machine learning algorithm 43' may be operated to correlate the product shipping patterns 53' with the component and product purchase patterns 45', 46'. The machine learning algorithm 43', also at Block 182, may be operated to correlate the product return patterns 55' with the component and product purchase patterns 45', 46', and where product shipping data 52' is also obtained, correlate additionally with the product shipping patterns 53'. More particularly, the machine learning algorithm 43' conceptually "overlays" the different patterns 45', 46', 53', 55' to determine when a predicted shortage 44' of a component 22a'-22n' is forthcoming or imminent. By correlating the patterns, the machine learning algorithm 43' is able to conceptually determine when each of the patterns 45', 46', 53', 55' "align" such that they are indicative of a predicted shortage 44'.

The operations regarding the generation and communication of the digital promotion 51' in Blocks 184 and 186 are similar to the operations described above with respect to Blocks 84 and 86. While product shipping data 52' and product return data 54' have been described herein as being obtained and used by the machine learning algorithm 43', those skilled in the art will appreciate that either or both of the product shipping data and the product return data may be input to the machine learning algorithm. Operations end at Block 188.

While a retailer and manufacturer have been described herein, it should be understood that a manufacturer may include a wholesaler that directs manufacture of the products 27a-27n. Indeed, the component supply system 20 maintains one or more databases of historical transactions between retailers and manufacturers and component (e.g., raw material) suppliers. In other words, the component supply processing server 40 maintains enough data points, both in terms of a data types and quantity, to determine and predict ups and down or trends in product purchasing behavior, which can be translated, for example, using machine learning, to predict raw material or component shortages.

A method aspect is directed to a method of processing component 22a-22n supply. The method includes using a component supply processing server 40 to obtain component purchase data 21 for each of a plurality of different components 22a-22n from a plurality different component suppliers 23a-23n, and obtain purchase settlement data 24 between a plurality of retailers 25a-25n and a plurality of manufacturers 26a-26n, each manufacturer selling a product 27a-27n to the plurality of retailers, and each product including at least one of the plurality of different components 22a-22n. The method also includes using the component supply processing server 40 to operate a machine learning algorithm 43 to determine a predicted shortage 44 of a given component 22a from among the plurality of different components 22a-22n by at least associating each of the plurality of manufacturers 26a-26n with a given component based upon the corresponding product 27a-27n, and accepting, as a first input to the machine learning algorithm, the component purchase data 21 to determine component purchase patterns 45 for each of the plurality of different components 22a-22n.

The machine learning algorithm 43 is operated to determine the component shortage 44 by at least accepting, as a second input to the machine learning algorithm, the purchase settlement data 24 to determine product purchase patterns 46 for each of the products 27a-27n, and correlating the component and product purchase patterns 45, 46 to determine, as an output of the machine learning algorithm 43, the predicted shortage 44 of at least one of the plurality of components 22a-22n. The method also includes using the component supply processing server 40 to generate a digital promotion 51 for a given product 27a based upon the plurality of components 22a-22n determined to have a component shortage 44, and communicate the digital promotion to a shopper device 30.

A computer readable medium aspect is directed to a non-transitory computer readable medium for processing component 22a-22n supply. The non-transitory computer readable medium includes computer executable instructions that when executed by a processor 41 of a component supply processing server 40 cause the processor to perform operations. The operations may include obtaining component purchase data 21 for each of a plurality of different components 22a-22n from a plurality different component suppliers 23a-23n, and obtaining purchase settlement data 24 between a plurality of retailers 25a-25n and a plurality of manufacturers 26a-26n, each manufacturer selling a product 27a-27n to the plurality of retailers, and each product including at least one of the plurality of different components.

The operations further include operating a machine learning algorithm 43 to determine a predicted shortage 44 of a given component 22a from among the plurality of different components 22a-22n by at least associating each of the plurality of manufacturers 26a-26n with a given component 22a based upon the corresponding product 27a-27n, accepting, as a first input to the machine learning algorithm 43, the component purchase data 21 to determine component purchase patterns 45 for each of the plurality of different components 22a-22n, and accepting, as a second input to the machine learning algorithm, the purchase settlement data 24 to determine product purchase patterns 46 for each of the products 27a-27n. The machine learning algorithm 43 is further be operated to determine the predicted shortage 44 by at least correlating the component and product purchase patterns 45, 46 to determine, as an output of the machine learning algorithm, the predicted shortage of at least one of the plurality of components 22a-22n. The operations further include generating a digital promotion 51 for a given product 27a based upon the at least one of the plurality of components 22a-22n determined to have a component shortage, and communicating the digital promotion to a shopper device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A component supply system comprising:
a shopper device; and
a component supply processing server configured to, for each iteration of a plurality of iterations
obtain component purchase data for each of a plurality of different components from a plurality of different component suppliers,
obtain purchase settlement data between a plurality of retailers and a plurality of manufacturers for a plurality of products, each manufacturer selling a given product from among the plurality thereof to the plurality of retailers, and each product including at least one of the plurality of different components,
obtain product shipping data for the plurality of products from a plurality of shippers,
obtain product return data for the plurality of products from a plurality of retailers,
operate a machine learning algorithm to determine a predicted shortage of a given component from among the plurality of different components by at least
associating each of the plurality of manufacturers with a corresponding component of the plurality of different components based upon the corresponding product,
accepting, as a first input to the machine learning algorithm, the component purchase data to determine component purchase patterns for each of the plurality of different components,
accepting, as a second input to the machine learning algorithm, the purchase settlement data to determine product purchase patterns for each of the products,
accepting, as a third input to the machine learning algorithm, the product shipping data to determine product shipping patterns for each of the products,
accepting, as a fourth input to the machine learning algorithm, the product return data to determine product return patterns for each of the products, and
correlating the product shipping patterns, product return patterns, component purchase patterns, and product purchase patterns to determine, as an output of the machine learning algorithm, the predicted shortage of at least one of the plurality of components, and
generate a digital promotion having a redeemable value associated therewith for a given product for purchase based upon the at least one of the plurality of different components determined to have a component shortage, set the redeemable value based upon the component shortage, and communicate the digital promotion to the shopper device.

2. The component supply system of claim 1 wherein the component supply processing server is configured to generate the digital promotion for the given product for purchase to be from among the plurality of products that includes the at least one of the plurality of different components determined to have a component shortage.

3. The component supply system of claim 1 wherein the product shipping data comprises at least one of shipping date data and delivery date data.

4. The component supply system of claim 1 wherein the product return data comprises at least one of product identification data, product return price data, and time from purchase-to-return data.

5. The component supply system of claim 1 wherein the component supply processing server is configured to operate the machine learning algorithm to determine an amount of the predicted shortage, and set the redeemable value of the digital promotion to be lower based upon a higher amount of the predicted shortage.

6. The component supply system of claim 1 wherein the purchase settlement data between a plurality of retailers and a plurality of manufacturers comprises at least one of product identification data, product quantity data, product purchase price data, product purchase date data, and product delivery date data.

7. The component supply system of claim 1 wherein the component purchase data comprises at least one of component identification data, component quantity data, component order date data, and component delivery date data.

8. The component supply system of claim 1 wherein the component supply processing server is configured to obtain the product return data for the plurality of products based upon communication with a plurality of point-of-sale (POS) devices associated with the plurality of retailers.

9. The component supply system of claim 1 wherein the component supply processing server is configured to operate a further machine learning algorithm to determine an amount of the predicted shortage, and set the redeemable value based upon the amount of the predicted shortage.

10. The component supply system of claim 1 wherein the component supply processing server is configured to obtain the product shipping data for the plurality of products based upon interfacing with shipment tracking software associated with the plurality of shippers.

11. A component supply processing server comprising:
a processor and an associated memory configured to, for each iteration of a plurality of iterations
obtain component purchase data for each of a plurality of different components from a plurality of different component suppliers,
obtain purchase settlement data between a plurality of retailers and a plurality of manufacturers for a plurality of products, each manufacturer selling a given product from among the plurality of products to the plurality of retailers, and each product including at least one of the plurality of different components,
obtain product shipping data for the plurality of products from a plurality of shippers,
obtain product return data for the plurality of products from a plurality of retailers,
operate a machine learning algorithm to determine a predicted shortage of a given component from among the plurality of different components by at least
associating each of the plurality of manufacturers with a corresponding component of the plurality of different components based upon the corresponding product,
accepting, as a first input to the machine learning algorithm, the component purchase data to determine component purchase patterns for each of the plurality of different components,
accepting, as a second input to the machine learning algorithm, the purchase settlement data to determine product purchase patterns for each of the products,
accepting, as a third input to the machine learning algorithm, the product shipping data to determine product shipping patterns for each of the products,
accepting, as a fourth input to the machine learning algorithm, the product return data to determine product return patterns for each of the products, and
correlating the product shipping patterns, product return patterns, component purchase patterns, and product purchase patterns to determine, as an output of the machine learning algorithm, the predicted shortage of at least one of the plurality of components, and
generate a digital promotion having a redeemable value associated therewith for a given product for purchase based upon the at least one of the plurality of different components determined to have a component shortage, set the redeemable value based upon the component shortage, and communicate the digital promotion to a shopper device.

12. The component supply processing server of claim 11 wherein the processor is configured to generate the digital promotion for the given product for purchase to be from among the plurality of products that includes the at least one of the plurality of different components determined to have a component shortage.

13. The component supply processing server of claim 12 wherein the processor is configured to operate the machine learning algorithm to determine an amount of the predicted shortage, and set the redeemable value of the digital promotion to be lower based upon a higher amount of the predicted shortage.

14. The component supply processing server of claim 11 wherein the processor is configured to obtain the product return data for the plurality of products based upon communication with a plurality of point-of-sale (POS) devices associated with the plurality of retailers.

15. The component supply processing server of claim 11 wherein the processor is configured to operate a further machine learning algorithm to determine an amount of the predicted shortage, and set the redeemable value based upon the amount of the predicted shortage.

16. The component supply processing server of claim 11 wherein the processor is configured to obtain the product shipping data for the plurality of products based upon interfacing with shipment tracking software associated with the plurality of shippers.

17. A method of processing component supply comprising:
using a component supply processing server to, for each iteration of a plurality of iterations
obtain component purchase data for each of a plurality of different components from a plurality of different component suppliers,
obtain purchase settlement data between a plurality of retailers and a plurality of manufacturers for a plurality of products, each manufacturer selling a given product from among the plurality of different products to the plurality of retailers, and each product including at least one of the plurality of different components,
obtain product shipping data for the plurality of products from a plurality of shippers,
obtain product return data for the plurality of products from a plurality of retailers,
operate a machine learning algorithm to determine a predicted shortage of a given component from among the plurality of different components by at least
associating each of the plurality of manufacturers with a corresponding component of the plurality of different components based upon the corresponding product,
accepting, as a first input to the machine learning algorithm, the component purchase data to determine component purchase patterns for each of the plurality of different components, accepting, as a second input to the machine learning algorithm, the purchase settlement data to determine product purchase patterns for each of the products, accepting, as a third input to the machine learning algorithm, the product shipping data to determine product shipping patterns for each of the products, accepting, as a fourth input to the machine learning algorithm, the product return data to determine product return patterns for each of the products, and correlating the product shipping patterns, product return patterns, component purchase patterns, and product purchase patterns to determine, as an output of the machine learning algorithm, the predicted shortage of at least one of the plurality of components, and generate a digital promotion having a redeemable value associated therewith for a given product for purchase based upon the at least one of the plurality of different components determined to have a component shortage, set the redeemable value based upon the component shortage, and communicate the digital promotion to a shopper device.

18. The method of claim 17 wherein using the component supply processing server comprises using the component supply processing server to operate the machine learning algorithm to determine an amount of the predicted shortage, and set the redeemable value of the digital promotion to be lower based upon a higher amount of the predicted shortage.

19. The method of claim 17 wherein using the component supply processing server comprises using the component supply processing server to obtain the product return data for the plurality of products based upon communication with a plurality of point-of-sale (POS) devices associated with the plurality of retailers.

20. The method of claim 17 wherein using the component supply processing server comprises using the component supply processing server to operate a further machine learning algorithm to determine an amount of the predicted shortage, and set the redeemable value based upon the amount of the predicted shortage.

21. A non-transitory computer readable medium for processing component supply, the non-transitory computer readable medium comprising computer executable instructions that when executed by a processor of a component supply processing server causes the processor to perform operations comprising, for each iteration of a plurality of iterations:

obtaining component purchase data for each of a plurality of different components from a plurality of different component suppliers;

obtaining purchase settlement data between a plurality of retailers and a plurality of manufacturers for a plurality of products, each manufacturer selling a given product from among the plurality of different products to the plurality of retailers, and each product including at least one of the plurality of different components;

obtaining product shipping data for the plurality of products from a plurality of shippers;

obtaining product return data for the plurality of products from a plurality of retailers;

operating a machine learning algorithm to determine the predicted shortage of a given component from among the plurality of different components by at least associating each of the plurality of manufacturers with a corresponding component of the plurality of different components based upon the corresponding product, accepting, as a first input to the machine learning algorithm, the component purchase data to determine component purchase patterns for each of the plurality of different components, accepting, as a second input to the machine learning algorithm, the purchase settlement data to determine product purchase patterns for each of the products, accepting, as a third input to the machine learning algorithm, the product shipping data to determine product shipping patterns for each of the products, accepting, as a fourth input to the machine learning algorithm, the product return data to determine product return patterns for each of the products, and correlating the product shipping patterns, product return patterns, component return patterns, and product purchase patterns to determine, as an output of the machine learning algorithm, the predicted shortage of at least one of the plurality of components, and generating a digital promotion having a redeemable value associated therewith for a given product for purchase based upon the at least one of the plurality of different components determined to have the predicted shortage, setting the redeemable value based upon the component shortage, and communicating the digital promotion to a shopper device.

22. The non-transitory computer readable medium of claim 21 wherein the operations comprise obtaining the product return data for the plurality of products based upon communication with a plurality of point-of-sale (POS) devices associated with the plurality of retailers.

23. The non-transitory computer readable medium of claim 21 wherein the operations comprise operating a further machine learning algorithm to determine an amount of the predicted shortage, and set the redeemable value based upon the amount of the predicted shortage.

* * * * *